(12) United States Patent
Chalasani et al.

(10) Patent No.: US 8,489,741 B2
(45) Date of Patent: Jul. 16, 2013

(54) POLICY ENABLED GRID ARCHITECTURE

(75) Inventors: Nanchariah R. Chalasani, Fairfax, VA (US); Quddus K. W. Chong, San Jose, CA (US); Dolapo M. Falola, New York, NY (US); Ajamu A. Wesley, Marlborough, MA (US); Andrea R. Yanik, Boston, MA (US)

(73) Assignee: International Business Machines Corporation, Armonk, NY (US)

( * ) Notice: Subject to any disclaimer, the term of this patent is extended or adjusted under 35 U.S.C. 154(b) by 4124 days.

(21) Appl. No.: 10/401,811

(22) Filed: Mar. 28, 2003

(65) Prior Publication Data
US 2004/0103339 A1    May 27, 2004

Related U.S. Application Data

(63) Continuation-in-part of application No. 10/301,192, filed on Nov. 21, 2002, now Pat. No. 7,055,052.

(51) Int. Cl.
*G06F 15/173* (2006.01)

(52) U.S. Cl.
USPC ............................................... 709/226

(58) Field of Classification Search
USPC ............... 709/203, 238, 223, 220, 226, 219, 709/224, 206, 246; 707/104, 202, 101; 706/20, 706/60, 47; 705/37, 35, 1, 44, 10, 14, 30, 705/7; 714/15; 717/126, 177, 101
See application file for complete search history.

(56) References Cited

U.S. PATENT DOCUMENTS

| 5,173,689 | A | 12/1992 | Kusano | 340/827 |
| 5,987,621 | A | 11/1999 | Duso et al. | 714/4 |
| 6,330,689 | B1 | 12/2001 | Jin et al. | 714/15 |
| 7,055,052 | B2 * | 5/2006 | Chalasani et al. | 714/4 |
| 7,200,657 | B2 * | 4/2007 | Adams et al. | 709/224 |
| 7,370,075 | B2 * | 5/2008 | Farquharson et al. | 709/203 |
| 2002/0007468 | A1 | 1/2002 | Kampe et al. | 714/4 |
| 2002/0046239 | A1 * | 4/2002 | Stawikowski et al. | 709/203 |

(Continued)

FOREIGN PATENT DOCUMENTS

WO    WO 02/01347    1/2002

OTHER PUBLICATIONS

Erik Christensen, Francisco Curbera, Greg Meredith, Sanjiva Weerawarana, "Web Services Description Language (WSDL) 1.1" In http://www.w3.org/TR/wsdl, Mar. 15, 2001.*

(Continued)

*Primary Examiner* — Joseph Avellino
*Assistant Examiner* — Mark O Afolabi
(74) *Attorney, Agent, or Firm* — Steven Greenberg, Esq.; Carey, Rodriguez, Greenberg & O'Keefe

(57) ABSTRACT

A self-governing, self-healing and self-optimizing policy oriented grid architecture. The architecture can include a hosting service configured for use in a computing grid. The hosting service can include a Web service; grid instrumentation coupled to the Web service; a Web service descriptive document; and, a service policy element disposed in the Web service descriptive document. The Web service descriptive document can include a WSDL type document. Moreover, at least one WSLA can be referenced in the WSDL type document. Notably, the service policy element can include at least one policy selected from the group consisting of a security assertion and a business rule. The security assertion can include a security assertion markup language (SAML) formatted authentication statement having a subject specifying a role identifier.

10 Claims, 3 Drawing Sheets

U.S. PATENT DOCUMENTS

| | | | | |
|---|---|---|---|---|
| 2004/0068731 A1* | 4/2004 | Davis et al. | | 719/310 |
| 2004/0083281 A1* | 4/2004 | Makagon et al. | | 709/223 |
| 2004/0098606 A1* | 5/2004 | Tan et al. | | 713/200 |
| 2004/0139144 A1* | 7/2004 | Batra et al. | | 709/200 |
| 2004/0167980 A1* | 8/2004 | Doyle et al. | | 709/225 |

OTHER PUBLICATIONS

Wolfgang Hoschek, "The Web Service Discovery Architecture" In Proc. of the Int'l. IEEE/ACM Supercomputing Conference (SC 2002), Baltimore, USA, Nov. 2002, p. 1-15.*

Ian Foster, Carl Kesselman, Jeffrey M. Nick and Steven Tuecke, "The Physiology of the Grid: An Open Grid Services Architecture for Distributed Systems Integration" In http://www.globus.org/research/papers/ogsa.pdf., Version: Jun. 22, 2002.*

T. Wu, *A Passive Protected Self-Healing Mesh Network Architecture and Applications*, IEEE/ACM Transactions on Networking, vol. 2, No. 1, pp. 40-52, (Feb. 1994).

R. J. Abbott, *Resourceful Systems and Software Fault Tolerance*, ACM 0-89791-271-3/88/0006, pp. 992-1000, (1988).

S. Han, et al., *Fast Restoration of Real-Time Communication Service from Component Failures in Multi-hop Networks*, Proc. of ACM SIGCOMM Symposium, vol. 27, No. 4, pp. 77-88, (Oct. 1997).

Stelling, et al., *A fault detection service for wide area distributed computations*, Cluster Computing 2, pp. 117-128, (1999).

Ravindran, et al., *Resource Management Middleware for Dynamic, Dependable Real-Time Systems*, Real-Time Systems, vol. 20, pp. 183-196, (2000).

K. Janssen, et al. *Component Failure Detection Via State Estimation*, A Bridge Between Control Science and Technology, IFAC Proc. Series, vol. 4, pp. 2213-2218, (1985).

Z. Medicoff, *Businesses gird for grid computing breakthroughs*, Globeandmail.com, Sep. 2002).

* cited by examiner

POLICY ENABLED GRID ARCHITECTURE

CROSS REFERENCE TO RELATED APPLICATIONS

This patent application is a continuation-in-part of presently U.S. patent application Ser. No. 10/301,192, entitled SELF HEALING GRID ARCHITECTURE FOR DECENTRALIZED COMPONENT-BASED SYSTEMS, filed on Nov. 21, 2002, now U.S. Pat. No. 7,055,052 the contents of which are incorporated herein by reference.

BACKGROUND OF THE INVENTION

1. Statement of the Technical Field

The present invention relates to the autonomic computing and more particularly to an autonomic Web services hosting infrastructure.

2. Description of the Related Art

Web services have become a focal point of technical innovation and new business opportunity. In particular, Web services offer a solution to the interoperability problem for heterogeneous computing systems. Consequently, Web services technology promises to provide computing resources to end users distributed about the global computer communications network based upon a pay-per-use model. Still, the rate of adoption for Web services technology remains inhibited by the complexity involved in deploying new Web services. In particular, providers of Web services hold strong concerns in regard to the availability of deployed Web services.

Specifically, from the perspective of the Web services provider, the unexpected unavailability of a deployed Web service can translate in lost business revenues, though the unexpected unavailability can arise from an excess demand for the deployed Web service which exceeds the capacity of the Web services hosting environment. As a result, typical hosting environments are "over-engineered" to ensure redundancy, quality of service and high availability. Consequently, system engineers find themselves trying to master the delicate and often expensive balance between over-capacity and under-utilization.

To balance both the matter of over-capacity and under-utilization in a Web services hosting environment, typically a communication mechanism is disposed between the gateway nodes the provide the Web services, the Web service deployment agency, and the agency tasked with deciding when to provision a Web service, or to offload the provisioning of the Web service to another host. The communication mechanism can provide critical coordination between the nodes and the agencies so that the tasked agency can effectively balance capacity and utilization of Web services.

Aside from high-availability considerations relating to the capacity of the Web services hosting environment, availability issues also can arise from the failure or mal-operation of a deployed Web services. More particularly, distributed systems as a whole often suffer based upon the characteristics of an individual component. For instance, where one Web service experiences a heavy load or fails altogether, the quality of service (QoS) experienced about the entire distributed system can degrade in quality. Therefore, the more distributed a system, the more important can be for the distributed system to be "autonomic".

In the famed manifesto, *Autonomic Computing: IBM's Perspective on the State of Information Technology*, Paul Horn, Senior Vice President of IBM Research, observed, "It's not about keeping pace with Moore's Law, but rather dealing with the consequences of its decades-long reign." Given this observation, Horn suggested a computing parallel to the autonomic nervous system of the biological sciences. Namely, whereas the autonomic nervous system of a human being monitors, regulates, repairs and responds to changing conditions without any conscious effort on the part of the human being, in an autonomic computing system, the system must self-regulate, self-repair and respond to changing conditions, without requiring any conscious effort on the part of the computing system operator.

Thus, while the autonomic nervous system can relieve the human being from the burden of coping with complexity, so too can an autonomic computing system. Rather, the computing system itself can bear the responsibility of coping with its own complexity. The crux of the IBM manifesto relates to eight principal characteristics of an autonomic computing system:

I. The system must "know itself" and include those system components which also possess a system identify.

II. The system must be able to configure and reconfigure itself under varying and unpredictable conditions.

III. The system must never settle for the status quo and the system must always look for ways to optimize its workings.

IV. The system must be self-healing and capable of recovering from routine and extraordinary events that might cause some of its parts to malfunction.

V. The system must be an expert in self-protection.

VI. The system must know its environment and the context surrounding its activity, and act accordingly.

VII. The system must adhere to open standards.

VII. The system must anticipate the optimized resources needed while keeping its complexity hidden from the user.

Conventional business models increasingly rely upon the use of Web services to maintain cross-platform compatibility, value-chain relationships, customer relationships, and partner relationships. With the rapid undertaking and deployment of Web services, however, focus has shifted to the interoperability of various Web services across the value chain. In furtherance of this effort, the Open Grid Services Architecture (OGSA) has been leveraged to address the problem of support and software maintenance among Web services components distributed about the Web services hosting environment.

Notably, the physiology of a grid mechanism through OGSA can provide protocols both in discovery and also in binding of Web services, hereinafter referred to as "grid services", across distributed systems in a manner which would otherwise not be possible through the exclusive use of registries, directories and discovery protocols. As described both in Ian Foster, Carl Kesselman, and Steven Tuecke, *The Anatomy of the Grid*, Intl J. Supercomputer Applications (2001), and also in Ian Foster, Carl Kesselman, Jeffrey M. Nick and Steven Tuecke, *The Physiology of the Grid*, Globus.org (Jun. 22, 2002), a grid mechanism can provide distributed computing infrastructure through which grid services instances can be created, named and discovered by requesting clients.

Grid services extend mere Web services by providing enhanced resource sharing and scheduling support, support for long-lived state commonly required by sophisticated distributed applications, as well as support for inter-enterprise collaborations. Moreover, while Web services alone address discovery and invocation of persistent services, grid services support transient service instances which can be created and destroyed dynamically. Notable benefits of using grid services can include a reduced cost of ownership of information technology due to the more efficient utilization of computing resources, and an improvement in the ease of integrating various computing components. Thus, the grid mechanism, and in particular, a grid mechanism which conforms to the OGSA, can implement a service-oriented architecture through which a basis for distributed system integration can be provided—even across organizational domains.

While grid services can be configured to provide an enhanced utilization of computing resources, grid services heretofore have not been able to provide a differential-utilization of computing resources. Varying levels of computing services can be provided based upon what has been referred to as a "policy based service differentiation model". In a policy based service differentiation model, the computing devices can offer many levels of service where different requests for different content or services which originate from different requesters receive different levels of treatment depending upon administratively defined policies. In that regard, a service level agreement (SLA) can specify a guaranteed level of responsiveness associated with particular content or services irrespective of any particular requestor. By comparison, quality of service (QoS) terms specify a guaranteed level of responsiveness minimally owed to particular requesters.

The policy based service differentiation model is the logical result of several factors. Firstly, the number and variety of computing applications which generate requests across networks both private and public has increased dramatically in the last decade. Each of these applications, however, has different service requirements. Secondly, technologies and protocols that enable the provision of different services having different security and service levels have become widely available. Yet, access to these different specific services must be regulated because these specific services can consume important computing resources such as network bandwidth, memory and processing cycles. Finally, business objectives or organizational goals can be best served when discriminating between different requests rather than treating all requests for computer processing in a like manner.

The Web service level agreement (WSLA) is a proposed specification which defines a markup language for representing assertions by a service provider to guarantee a defined level of service. By comparison, WS-Policy is a proposed specification which provides a general purpose framework for describing and communicating policies and business rules associated with a Web service. As cross-enterprise technologies such as the Web service and the grid services mechanism adopt autonomic principals, the need exists to leverage business rules to govern the self-adapting nature of the Web services hosting environment.

Grid and autonomic computing enables dynamic business relationships. Maintaining security across this dynamic environment is necessary in order to execute secure transactions. In this regard, the need to apply and manage security policies bound to grid services is a key enabler of on-demand computing between business entities in a grid computing environment. Yet, utility and grid models along with autonomic self-optimization techniques imply that Web services will be hosted by foreign security domains, in a potentially ad-hoc fashion. Accordingly, the hosting of Web services within various foreign security domains represents a challenge as applications are typically deployed with an assumed security infrastructure in place. This assumption cannot hold in the grid environment, however.

SUMMARY OF THE INVENTION

A self-governing, self-healing and self-optimizing grid architecture can be provided in accordance with the present invention. Specifically, the architecture can include a hosting service configured for use in a computing grid. The hosting service can include a Web service; grid instrumentation coupled to the Web service; a Web service descriptive document; and, a service policy element disposed in the Web service descriptive document. The Web service descriptive document can include a Web services definition language (WSDL) type document. Moreover, at least one WSLA can be referenced in the WSDL type document.

Notably, the service policy element can include at least one policy selected from the group consisting of a security assertion and a business rule. The security assertion can identify recognized roles and a mechanism for validating individual recognized roles. In this regard, the security assertion can include a security assertion markup language (SAML) formatted authentication statement having a subject specifying a role identifier. Additionally, the SAML formatted authentication statement can have a subject confirmation.

In a computing grid, a method for governing autonomic characteristics of a grid hosting infrastructure can include loading a code base for an invoked Web service and an associated descriptive document. The descriptive document can be parse to identify established SLAs. The descriptive document can be further parsed to identify security assertions. Finally, A monitor coupled to the invoked Web service can be configured to govern the invoked Web service according to the identified established SLAs and the identified security assertions. The method also can include instrumenting the invoked Web service with the configured monitor. Moreover, grid services DNA can be encoded with the identified security assertions. In both circumstances, the invoked Web service can be activated in the computing grid.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENTS

The present invention is an autonomic Web services hosting infrastructure in which Web services disposed within a distributed host can be accessed according to the terms of a Web services policy both associated with the Web service and coupled to the Web service in the distributed host. More particularly, autonomic characteristics of a Web service can be governed through assertions provided in a Web services policy such as those incorporated as part of a WSDL document. Notably, both business service level assertions and security assertions can be provided within the Web services policy which can be enforced in an attempt to access the Web service. In this way, though the host domain may fall outside the scope of control of controlling entity responsible for governing access to the Web service, access to the Web service can be governed nonetheless according to the terms of the Web services policy which can be distributed along with the Web service into the foreign domain.

Figure 1:
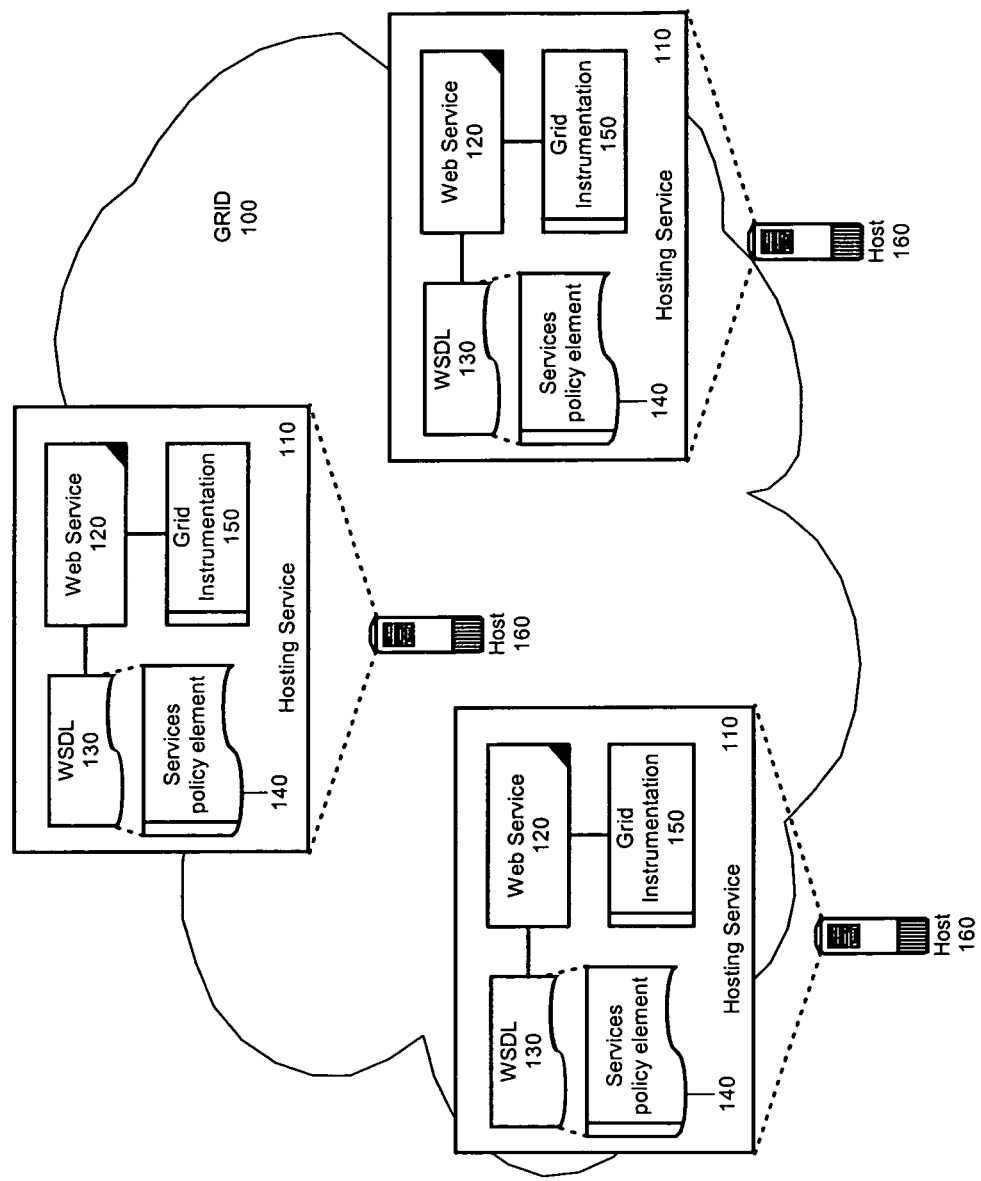
FIG. 1 is a schematic illustration of grid services architecture in which individual Web services can be governed according to the terms of a distributed services policy in accordance with the present invention.

FIG. 1 is a schematic illustration of grid services architecture in which individual Web services can be governed according to the terms of a distributed services policy in accordance with the present invention. The grid 100 can include a multiplicity of hosting services 110 physically disposed within a host 160 such as an actual computing device, or a virtual machine. A hosting service is the managing entity for a collection of Web services. The hosting service is the logical model of grid service components in a Web service hosting environment that can monitor Web service sessions, make provisioning decisions, communicate with peer hosting services, and deploy Web services on request.

In a preferred aspect of the present invention, each hosting service component in the hosting service can be a grid service described using WSDL and invoked, for example, over SOAP. Moreover, the hosting service components can be physically running under the same server, or the hosting service components can be distributed over a network. In either case, the hosting services form the nodes of the autonomic grid of the present invention. Each hosting service 110 can include a Web service 120. In accordance with the principles of grid computing, the Web service 120 can be configured with grid instrumentation 150 for monitoring and controlling both access to existing instances of the Web service 120 and also the creation of new instances of the Web service 120 both within the hosting service 110 and in other hosting services.

Significantly, the Web service 120 can have associated therewith a WSDL document 130 which is descriptive of the interface of the Web service 120 and the characteristics of the Web service 120. The WSDL document 130 can include a Web services policy element 140, including a WS-Policy portion, a SAML portion, or both. Importantly, the services policy element 140 can specify additional business rules through which service providers can guarantee which Web services are to be available to certain requesters, which roles or entities can receive preferential treatment in a request for access to a Web service, and when services for a particular role or entity can be hosted.

To that end, the services policy element 140 can include one or more references to implicated WSLA documents established between the service provider and respective requesters. Each WSLA itself can establish the parties to the WSLA, service definitions for an associated Web service including pertinent metrics, and obligations for the SLA. Additionally, each WSLA can specify courses of action to occur in the event of violations of the obligations of the SLA.

Figure 2:
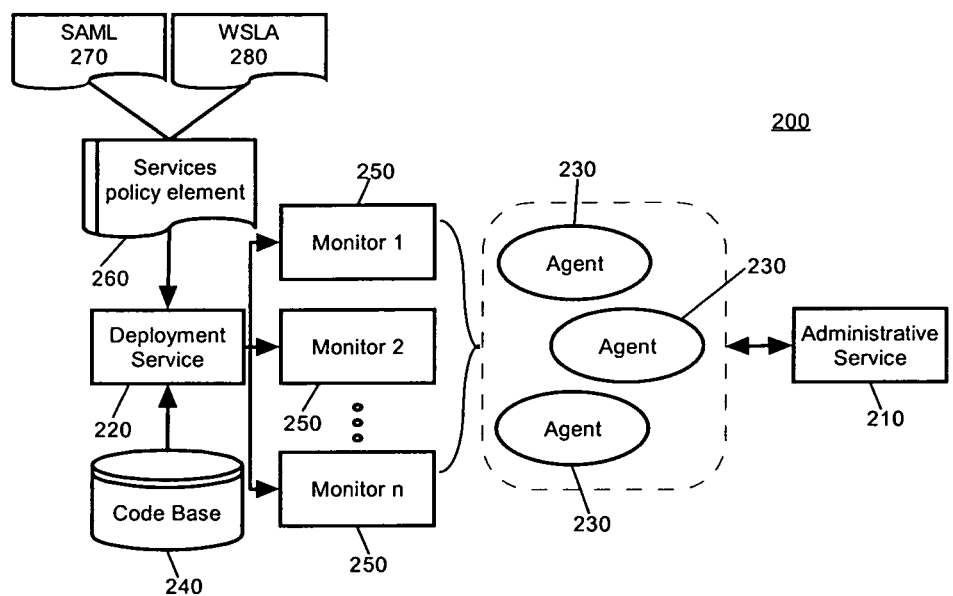
FIG. 2 is a schematic illustration of a hosting service configured to host a Web service configured for governance according to the terms of a distributed services policy; and, FIG. 3 is a flow chart illustrating a process for autonomically governing the operation of a Web service according to the terms of an associated distributed services policy.

FIG. 2 is a schematic illustration of a hosting service configured to host a Web service configured for governance according to the terms of a distributed services policy. The hosting service 200 can include an administrative service component 210, a deployment service component 220, one or more agent components 230, a code base 240 and one or more monitor components 250. In operation, the administrative service 210 can receive requests from a foreign hosting service, or an administrative client to deploy a particular Web service. The administrative service 210 can determine whether the request can be satisfied locally, and if so, the administrative service 210 can instruct the local deployment service 220 to deploy the particular Web service.

Upon command, the deployment service component 220 can retrieve the source code for the particular Web service from a selected location in a code base 240. Additionally, the deployment service component 220 can add grid service functionality to the retrieved source code and the deployment service component 220 can recompile the source code to produce a wrapped Web service. Finally, the deployment service component 220 can deploy the wrapped Web service and the deployment service component 220 can associate the wrapped Web service with a grid service proxy referred to herein as a monitor component 250. Notably, the hosting service 200 can host any type of Web service so long as the Web service can be wrapped with suitable instrumentation and associated with a monitor component 250.

By establishing a monitor component 250 for every Web service deployed, the state of the Web service instance can be monitored in terms of external invocations, response time, and the source of invocation requests. The metrics compiled by the monitor component 250 can be used by the agents 230 in performing intelligent provisioning and in enforcing the obligations of an associated WSLA. For instance, each monitor component 250 can notify the agents 230 whenever external clients invoke the services of a corresponding wrapped Web service. Each agent 230 then can determine whether to provision a Web service based upon internal provisioning rules and the metrics forwarded to the agent 230 by the corresponding monitor component 250.

If it is determined that a Web service should be provisioned, the agent 230 can remotely send a deployment request to the administrative service 210. The administrative service 210, in turn, can decide whether to deploy the Web service locally or remotely in addition to communicating capability information regarding the hosting service 200 to other hosting services in the grid. Importantly, a startup process for the hosting service 200 can make use of the deployment capability, so that an administrator client can request that an unutilized hosting service deploy and begin to host an initial collection of Web services.

Notably, any Web service hosted within the hosting service 200 can be grid-enabled at deploy-time. Using the original Web service implementation code stored in the code base 240, the deployment service can generate and compile a new class that can wrap the core Web service with additional grid service functionality. The grid specific functions that can be added can include, for example, operations that enable communication on the grid and operations that enable the storing of state information at run-time. Significantly, one skilled in the art will recognize that adding grid functionality to a Web service provides for more efficient service publishing, binding and discovery. Moreover, the grid administrative service can deploy Web services with an expiration timer, to ensure that deployed Web services do not become stale.

Grid enabled Web services also can make use of lifetime management specific grid functionality such as calling an explicit destruction request upon itself. Binding, similarly, can be more efficient in the grid context because the code base can store differing versions of the same Web service, each version having a specific optimization for particular hosting service configurations. Also, improved discovery of deployed Web services can be enabled through the use of the grid infrastructure's decentralized subscription and advertising mechanism, making each hosting service a portal to information about Web services availability throughout the grid. Finally, because the grid infrastructure operates on an application layer, deploying Web services in the grid can require the use merely of the same underlying mechanisms for all Web services, thereby greatly simplifying the process of deploying disparate Web services.

Significantly, the deployment service 220 upon deploying a Web service first can process WS-Policy rules disposed with the Service policy element 260 to resolve the existence of both of security assertions 270 and also one or more associated WSLA documents 280. In reference to the security assertions 270, roles for the assertions can be included upon generation of the monitors 250. In reference to the associated WSLA documents 280, a WSLA oriented agent 230 can be deployed to process each WSLA 280. The monitors 250 can further be generated with thresholds which can be defined based upon the terms of the WSLA documents 280. In this way, as thresholds are approached, for instance response times, requests for access to the Web service can be diverted to other instances of the Web service.

Figure 3:
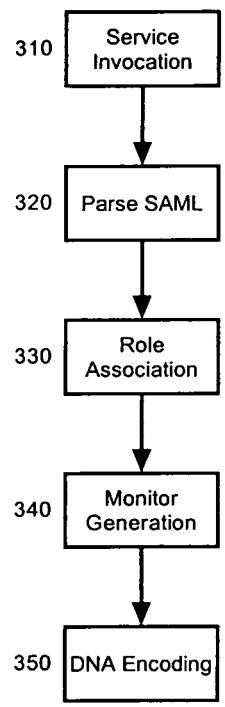

FIG. 3 is a flow chart illustrating a process for autonomically governing the operation of a Web service according to the terms of an associated distributed services policy. Beginning in block 310, a Web service can be invoked in the hosting service. Response to the service invocation, an associated WSDL document can be identified for the invoked Web service. Within the WSDL document, a SAML portion can be identified. In block 320, the identified SAML portion can be parsed to locate a role identifier and a security domain, for instance. In block 330, the role can be associated with individual requestor and requestor types.

In this regard, it is presumed that security assertions can be identified within SOAP headers associated with services requests so as to match roles with specific security assertions specified within the SAML portion of the WSDL document. Specifically, the Web Services Security SAML Token Profile can be leveraged in this regard. In block 340, a monitor can be generated to enforce the assertions of the SAML portion of the WSDL document. Finally, in block 350, grid services DNA for the invoked Web service can be encoded with the policy of the SAML portion of the WSDL document.

The present invention can be realized in hardware, software or firmware, in a centralized fashion in one computer system, or in a distributed fashion where different elements are spread across several interconnected computer systems. Any kind of computer system, or other apparatus adapted for carrying out the methods described herein, is suited to perform the functions described herein. A typical centralized implementation could include a general purpose computer system with a computer program that, when being loaded and executed, controls the computer system such that it carries out the methods described herein.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. In a computing grid, a method for governing autonomic characteristics of a grid hosting infrastructure, the method comprising the steps of:
    loading a code base for an invoked Web service and an associated descriptive document;
    parsing said descriptive document to identify established service level agreements (SLAs);
    further parsing said descriptive document to identify security assertions; and,
    configuring a monitor coupled to said invoked Web service to govern said invoked Web service according to said identified established SLAs and said identified security assertions.

2. The method of claim 1, further comprising the step of instrumenting said invoked Web service with said configured monitor.

3. The method of claim 2, further comprising the step of encoding grid services DNA with said identified security assertions.

4. The method of claim 2, further comprising the step of activating said invoked Web service in the computing grid.

5. The method of claim 3, further comprising the step of activating said invoked Web service in the computing grid.

6. A machine readable storage device having stored thereon a computer program for governing autonomic characteristics of a grid hosting infrastructure in a computing grid, the computer program comprising a routine set of instructions for causing the machine to perform the steps of:
    loading a code base for an invoked Web service and an associated descriptive document;
    parsing said descriptive document to identify established service level agreements (SLAs);
    further parsing said descriptive document to identify security assertions; and,
    configuring a monitor coupled to said invoked Web service to govern said invoked Web service according to said identified established SLAs and said identified security assertions.

7. The machine readable storage device of claim 6, further comprising the step of instrumenting said invoked Web service with said configured monitor.

8. The machine readable storage device of claim 7, further comprising the step of encoding grid services DNA with said identified security assertions.

9. The machine readable storage device of claim 7, further comprising the step of activating said invoked Web service in the computing grid.

10. The machine readable storage device of claim 8, further comprising the step of activating said invoked Web service in the computing grid.

* * * * *